Patented Apr. 11, 1950

2,503,334

UNITED STATES PATENT OFFICE 2,503,334

PRODUCTION OF MONOCHLORACETIC ACID

Alan Roger Hammond, John Alec John, and Ronald Page, Spondon, near Derby, England, assignors to Celanese Corporation of America, a corporation of Delaware No Drawing. Application December 30, 1947, Serial No. 794,780. In Great Britain January 13, 1947

2 Claims. (Cl. 260—539)

This invention relates to organic compound manufacture, and is more particularly concerned with the manufacture of chloracetic acid.

Chloracetic acid is commonly prepared by passing gaseous chlorine into acetic acid containing a little acetic anhydride together with iodine to catalyse the reaction. The process is usually carried out at about 100–110° C. and under atmospheric pressure, and although chlorine is at first rapidly absorbed, in practice the rate of absorption falls off so that the conversion is about 40%. This has been found to be the case whatever quantity of acetic anhydride is used in the starting mixture and however much iodine is used. Thus, the production of chloracetic acid using iodine in quantity of from less than 1% to about 5% on the weight of the acetic acid, together with quantities of acetic anhydride equal to from 2–10% of the weight of the acetic acid, always leads to a conversion which does not amount to more than about 40% of that theoretically possible. With a view to increasing the conversion and reducing the time occupied in the chlorination phosphorus and phosphorus compounds have been used to catalyse the reaction together with iodine.

According to the present invention, the production of chloracetic acid by reaction between chlorine and acetic acid is conducted in the absence of an inorganic chlorination catalyst, but whilst maintaining throughout the chlorination the presence of acetyl chloride in the reaction medium, the introduction of chlorine being continued until 50% or more of the acetic acid initially present has been converted to chloracetic acid. It has been found that providing precautions are taken which ensure that some acetyl chloride is always present in the reaction medium, the conversion can be carried well beyond 50% without difficulty and that conversions of 60% to 80% or even more can be obtained without the necessity of carrying on the process for an uneconomic period.

The invention, in addition to avoiding the expense of using iodine, phosphorus or phosphorus compounds, offers notable advantages in that the chloracetic acid produced is not contaminated by such substances as iodo-acetic acid or phosphorus compounds and, by carrying the conversion beyond 60%, a reaction product is obtained from which it is possible to recover chloracetic acid simply by cooling to crystallisation, a pure product being immediately available.

The continued presence of acetyl chloride in the reaction medium can be assured by adding a small quantity of this compound when the rate of absorption begins to fall noticeably. Instead of adding acetyl chloride, acetic anhydride may be added and is usually more convenient to use, this compound reacting readily with the chlorine being introduced with the production of chloracetic acid and acetyl chloride. During the progress of the reaction the acetyl chloride appears to be carried off from the reaction zone together with the hydrogen chloride which is produced in the reaction, and it is for this reason that a further quantity or quantities of acetyl chloride or acetic anhydride must be added during the process before a conversion of more than 50% can be obtained. In practice it is convenient to add the additional acetyl chloride or acetic anhydride before absorption falls off noticeably, the exact period or periods to be observed between the time when the process is started up and the first and any subsequent additions being determined by preliminary trials. In practice it has been found convenient to make the additions after absorption times of 3–5 hours, although it may sometimes be convenient to use shorter periods, for example only 2–3 hours. If great care is taken to keep low the loss of acetyl chloride from the reaction zone, or if a slower rate of absorption and hence longer over-all reaction time is permissible, longer absorption periods, e. g. 5 to 8 hours or more, may be used. When passing chlorine, at a rate of 15 to 20 parts per hour, into 100 parts of acetic acid containing initially 3–5 parts of acetic anhydride, it has been found possible by adding 2–3 parts of additional acetic anhydride after 4 hour absorption periods, to obtain in 12 hours a product which crystallised on cooling and was equivalent to a conversion of more than 80%. (All parts by weight.)

While the invention has been described more particularly in connection with the manufacture of chloracetic acid, it may also with advantage be applied to the chlorination of other lower aliphatic acids, for example to the production of chlorpropionic acid, the corresponding acidyl chloride being introduced as such or by adding the corresponding anhydride to the reaction liquor so as to ensure at all times the presence of a small quantity of the acidyl chloride during the process.

The following example illustrates the invention as applied to the manufacture of monochloracetic acid:

*Example*

95–100 parts by weight of glacial acetic acid together with 4 parts by weight of acetic anhydride are charged into a glass-lined reaction vessel heated by an oil bath maintained at about 105° C. Chlorine is introduced at a rate of 16–17 parts by weight per hour by means of a sintered glass distributor below the surface of the acetic acid. The introduction of chlorine is maintained for a period of 12 hours approximately 2 parts by weight of acetic anhydride being added to the reactants every 2 to 3 hours.

The product crystallises on cooling and, after drying in a vacuum desiccator over caustic soda, yields approximately 150 parts by weight of crystals analysing as 97.5% monochloracetic acid by titration with caustic soda, the conversion amounting to about 82%.

Having described our invention, what we desire to secure by Letters Patent is:

1. Process for the manufacture of mono-chloracetic acid, which comprises passing chlorine into a hot liquid mixture of acetic acid and a minor proportion of acetic anhydride to form mono-chloracetic acid and acetyl chloride, continuing passage of chlorine into said mixture for a period not exceeding 12 hours and replacing acetyl chloride lost therefrom by adding further anhydride thereto to avoid substantial reduction in the rate of chlorine absorption until more than 60% of the acetic acid has been converted into mono-chloracetic acid, and thereafter cooling the chlorination product and separating crystalline mono-chloracetic acid therefrom.

2. Process for the manufacture of mono-chloracetic acid, which comprises passing chlorine into a hot liquid mixture of acetic acid and a minor proportion of acetic anhydride to form mono-chloracetic acid and acetyl chloride, continuing passing of chlorine into said mixture for a period not exceeding 12 hours and replacing acetyl chloride lost therefrom by adding further anhydride thereto at intervals of from 2 to 3 hours to avoid substantial reduction in the rate of chlorine absorption until more than 80% of the acetic acid has been converted into mono-chloracetic acid and thereafter cooling the chlorination product and separating crystalline mono-chloracetic acid therefrom.

ALAN ROGER HAMMOND.
JOHN ALEC JOHN.
RONALD PAGE.

REFERENCES CITED

The following references are of record in the file of this patent:

UNITED STATES PATENTS

| Number | Name | Date |
|---|---|---|
| 1,993,713 | Bass et al. | Mar. 5, 1935 |
| 2,043,670 | Loder et al. | June 9, 1936 |

FOREIGN PATENTS

| Number | Country | Date |
|---|---|---|
| 638,117 | Germany | Oct. 22, 1936 |